US009077864B2

(12) United States Patent
Park et al.

(10) Patent No.: US 9,077,864 B2
(45) Date of Patent: Jul. 7, 2015

(54) METHOD AND APPARATUS FOR CONTROLLING MONITORING CAMERAS

(75) Inventors: Joon-young Park, Changwon (KR); Myung-seok An, Changwon (KR); Yong-jun Ryu, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 436 days.

(21) Appl. No.: 12/830,034

(22) Filed: Jul. 2, 2010

(65) Prior Publication Data

US 2011/0007130 A1    Jan. 13, 2011

(30) Foreign Application Priority Data

Jul. 8, 2009   (KR) .................. 10-2009-0062225

(51) Int. Cl.
*H04N 5/00* (2011.01)
*H04N 7/18* (2006.01)
*H04N 5/232* (2006.01)

(52) U.S. Cl.
CPC ............. *H04N 7/181* (2013.01); *H04N 5/232* (2013.01)

(58) Field of Classification Search
USPC ........ 348/36–39, 135–160, 47; 382/190, 192, 382/194, 195, 205, 209, 217–220, 224, 225, 382/254, 276, 278
See application file for complete search history.

(56) References Cited

U.S. PATENT DOCUMENTS

| 7,697,025 | B2 * | 4/2010 | Hasegawa et al. | 348/143 |
| 7,697,205 | B2 * | 4/2010 | Noguchi et al. | 359/580 |
| 8,831,505 | B1 * | 9/2014 | Seshadri | 434/351 |
| 2002/0196330 | A1 * | 12/2002 | Park et al. | 348/49 |
| 2003/0197785 | A1 * | 10/2003 | White et al. | 348/207.99 |
| 2004/0017471 | A1 * | 1/2004 | Suga et al. | 348/143 |
| 2005/0128292 | A1 * | 6/2005 | Miyamaki et al. | 348/143 |
| 2005/0280706 | A1 * | 12/2005 | Jong | 348/143 |
| 2006/0119703 | A1 * | 6/2006 | Hibi et al. | 348/143 |
| 2006/0120624 | A1 * | 6/2006 | Jojic et al. | 382/284 |
| 2006/0195876 | A1 * | 8/2006 | Calisa | 725/105 |

FOREIGN PATENT DOCUMENTS

KR          10-0328397 B1    3/2002

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

A method and an apparatus of controlling a plurality of monitoring cameras which transmit a plurality of live-view images of a plurality of channels, respectively, are provided. The method includes: displaying a panorama image of a channel among the plurality of channels on a panorama region in a screen of a display unit; and controlling at least one of a monitoring camera of the channel and the panorama image according to a command input by a user.

11 Claims, 7 Drawing Sheets

METHOD AND APPARATUS FOR CONTROLLING MONITORING CAMERAS

CROSS-REFERENCE TO RELATED PATENT APPLICATION

This application claims priority from Korean Patent Application No. 10-2009-0062225, filed on Jul. 8, 2009, the disclosure of which is incorporated herein in its entirety by reference.

BACKGROUND

1. Field

Methods and apparatuses consistent with exemplary embodiments relate to controlling monitoring cameras, and more particularly, to controlling monitoring cameras of a plurality of channels which are connected via a communication network.

2. Description of the Related Art

Monitoring cameras can be connected to a controlling device, such as a computer, via a communication network and perform panning, tilting and zooming according to controlling commands from the controlling device. The panning is an operating of rotating a monitoring camera in a horizontal direction, and the tilting is an operation of rotating the monitoring camera in a vertical direction.

SUMMARY

In operating monitoring cameras, a user may search for regions to be monitored and designate the regions while performing panning and tilting of the monitoring cameras.

For example, if the user wants to watch an enlarged image of a certain area included in a monitoring region of one monitoring camera, the user should search for the area and designate the area while performing panning and tilting of the monitoring camera.

In addition, if the user wants to monitor a plurality of points by a set time interval within the entire monitoring region of one monitoring camera, the user may need to search for the points and designate the points while performing panning and tilting of the monitoring camera.

One or more exemplary embodiments provide a method and apparatus for controlling monitoring cameras, which allow a user to easily search for designated areas without performing panning and/or tilting with respect to each of the monitoring cameras in a monitoring system, in which a plurality of monitoring cameras transmit images through a plurality of channels, respectively, in a communication network.

According to an aspect of an exemplary embodiment, there is provided a method of a plurality of monitoring cameras which transmit a plurality of live-view images of a plurality of channels, respectively, the method including: displaying a panorama image of a channel among the plurality of channels on a panorama region in a screen of a display unit; and controlling at least one of a monitoring camera of the channel and the panorama image according to a command input by a user.

The method may further include: displaying a live-view image of the channel on the panorama region or a live-view region in the screen before the displaying the panorama image of the channel on the first region in the screen; and generating the panorama image of the channel using the live-view image.

The displaying the live-view image may include: inputting data for at least one of the monitoring camera and the channel; and displaying the live-view image on the panorama region or a live-view region in the screen according to the data. The inputting data may include: generating a signal pointing to the live-view region; displaying an input means for the user according to the signal; and inputting the data using the input means by the user.

In the displaying the panorama image of the channel, the panorama image may be generated by at least one of panning, tilting and zooming operations on the monitoring camera.

The controlling at least one of the monitoring camera and the panorama image may include: inputting data, corresponding to the command, for at least one of the monitoring camera and the channel; and controlling the monitoring camera according to the data. The controlling at least one of the monitoring camera and the panorama image may include: designating at least one area in the panorama image using an input means without performing any of panning, tilting and zooming of the monitoring camera of the channel; and displaying images of the designated at least one area in another region in the screen. The images of the designated at least one area may be displayed in the other region at a predetermined order and at a preset time interval. The controlling at least one of the monitoring camera and the panorama image may include: enlarging or reducing an image corresponding to a designated area included in the panorama image without performing any of panning, tilting and zooming of the monitoring camera of the channel; and displaying the enlarged or reduced image in another region in the screen.

According to an aspect of an exemplary embodiment, there is provided an apparatus controlling a plurality of monitoring cameras which transmit a plurality of live-view images of a plurality of channels, respectively, the apparatus including a control unit which controls a display unit, connected to the control unit, to display a panorama image of a channel among the plurality of channels on a panorama region in a screen of the display unit, and control at least one of a monitoring camera of the channel and the panorama image according to a command input by a user.

BRIEF DESCRIPTION OF THE DRAWINGS

The above and other aspects will become more apparent by describing in detail exemplary embodiments with reference to the attached drawings, in which.

DETAILED DESCRIPTION OF EXEMPLARY EMBODIMENTS

Hereinafter, exemplary embodiments will be described in detail with reference to accompanying drawings.

Figure 1:
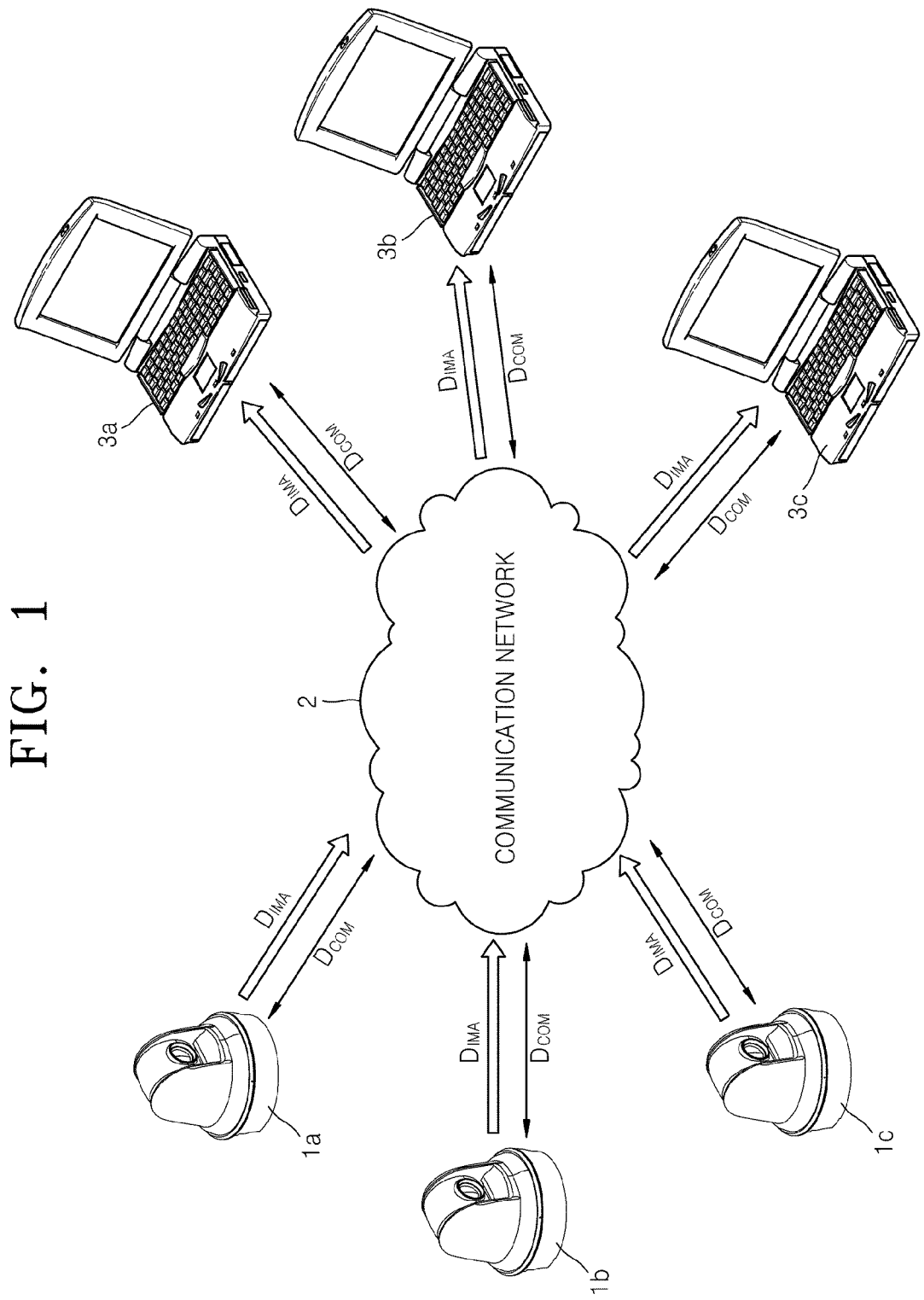
FIG. 1 is a diagram showing communications between computers, which are controlling devices, and monitoring cameras via a communication network, according to an exemplary embodiment.

FIG. 1 shows that computers 3a, 3b and 3c which are controlling devices communicate with monitoring cameras 1a, 1b and 1c via a communication network 2 according to an exemplary embodiment. The number of the computers and the number of the monitoring cameras are not limited to three (3) as shown in FIG. 1.

Referring to FIG. 1, the monitoring cameras 1a, 1b and 1c communicate with the computers 3a, 3b and 3c via communication channels $D_{COM}$s, and transmit live-view images to the computers 3a, 3b and 3c via an image data channels $D_{IMA}$s.

Each of the computers 3a, 3b and 3c which are the controlling devices displays and stores live-view images transmitted from the monitoring cameras 1a, 1b and 1c.

Figure 7:
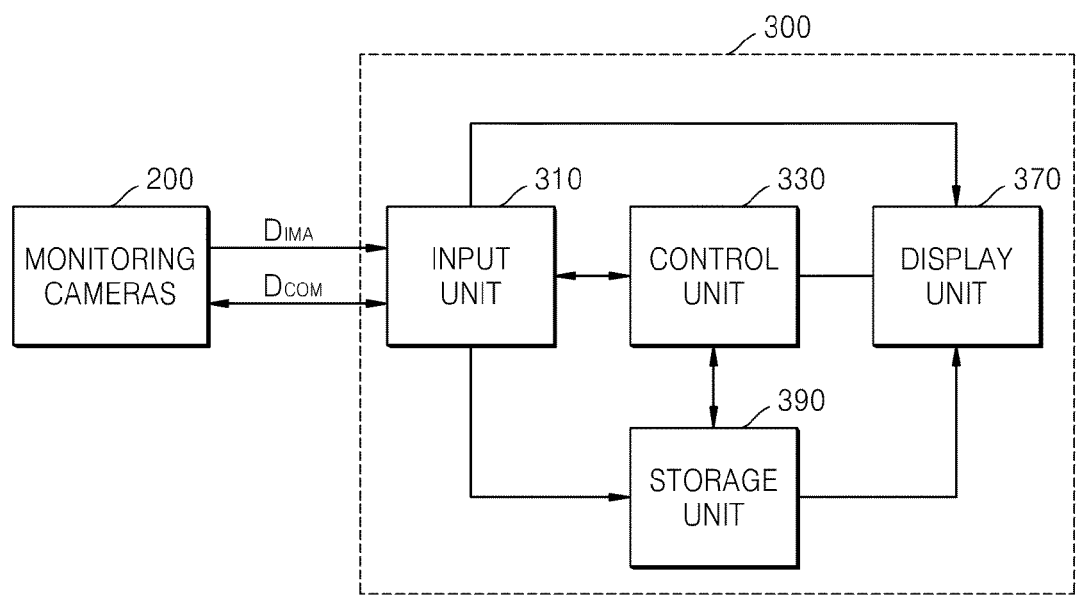
FIG. 7 shows a block diagram of each of the computers 3a, 3b and 3c shown in FIG. 1, according to an exemplary embodiment.

FIG. 7 shows a block diagram of a computer 300 corresponding to each of the computers 3a, 3b and 3c shown in FIG. 1, according to an exemplary embodiment. Referring to FIG. 7, each of the computers 3a, 3b and 3c includes an input unit 310, a control unit 330, a display unit 370 and a storage unit 390. The input unit 310 receives the live-view images from monitoring cameras 200 corresponding to the monitoring cameras 1a, 1b and 1c shown in FIG. 1 through the image data channels $D_{IMA}$s. The control unit 330 controls overall operations of the input unit 310, the display unit 370 and the storage unit 390. Specifically, the control unit 310 processes the live-view images received through the input unit 310, stores in the storage unit 390 and/or transmits to the display unit 370 the received live-view images and/or processed live-view images. The control unit 330 also controls the display unit 370 to display the received live-view images and/or processed live-view images. The display unit 370 may be implemented as a separate device from each of the computers 3a, 3b and 3c. The storage unit 390 stores the input live-view images and/or the processed live-view images. The processed live-view images include a panorama image, an enlarged panorama image, a reduced panorama image, etc. The control unit 330 receives and processes commands or data input by a user. The control unit 330 also controls operations of the monitoring cameras 1a, 1b and 1c by generating and transmitting control signals through the input unit 310 and the communication channels $D_{COM}$s. For example, panning, tilting and/or zooming operations of the monitoring cameras 1a, 1b and 1c are controlled by the control unit 330.

Figure 2:
FIG. 2 is an exemplary diagram of a screen displayed on a display panel by a computer among the computers shown in FIG. 1, according to an exemplary embodiment.

FIG. 2 shows a screen that is displayed on the display unit 370 by the control unit 330 of one of the computers 3a, 3b and 3c with reference to FIGS. 1 and 7, according to an exemplary embodiment.

Referring to FIGS. 1, 2 and 7, the control unit 330 controls live-view images of selected channels to be displayed on live-view regions 22a, 22b, 22c and 22d in the screen of the display unit 370. The channels, through which the live-view images are provided, are selected by the user through the control unit 330, and the live-view regions 22a, 22b, 22c and 22d are also selected by the user through the control unit 330.

In addition, the control unit 330 controls monitoring camera 1a, 1b or 1c of the selected channel to generate a panorama image of the channel that is selected by the user among the channels for the images displayed on the live-view regions 22a through 22d, and then, the control unit 330 controls the display unit 370 to display the panorama image on a panorama region 21. For this, the monitoring camera 1a, 1b or 1c of the selected channel performs panning and/or tilting operations to generate the panorama image by the control of the control unit 330.

Also, the control unit 330 controls the monitoring camera 1a, 1b or 1c of the panorama image channel and the panorama image according to commands input by the user.

That is, in a state where the panorama image is displayed on the panorama region 21, the monitoring camera 1a, 1b or 1c of the panorama image channel and the panorama image are controlled by the control unit 330 according to commands input by the user.

Therefore, the user may easily search for areas that are to be designated, and designate the areas in the panorama image displayed on the panorama region 21 without performing panning and/or tilting operations with respect to each of the monitoring cameras 1a, 1b and 1c.

For example, if the user wants to watch an enlarged view of a certain area within an entire monitoring region of one of the monitoring cameras 1a, 1b and 1c, the user may easily search for the certain area which image is to be enlarged and designate the certain area within the panorama image displayed on the panorama region 21 without performing panning and/or tilting operations of the monitoring camera 1a, 1b or 1c.

In addition, if the user wants to sequentially monitor a plurality of points with a set time interval within the entire monitoring region of one monitoring camera 1a, 1b or 1c, the user may easily search for the plurality of points and designate the points to be monitored in the panorama image displayed on the panorama region 21 without performing panning and/or tilting operations of the monitoring camera 1a, 1b or 1c.

The above operations will be described in more detail with reference to FIGS. 3 through 6.

In FIG. 2, a reference numeral 24 denotes a range of angle that represents a panning range of the panorama region 21.

When the user clicks a left button 23a by using a mouse, the panorama image displayed on the panorama region 21 is moved in a left direction by 10°.

When the user clicks a right button 23b by using the mouse, the panorama image displayed on the panorama region 21 is moved in a right direction by 10°.

When the user clicks a zoom button 23c by using the mouse, the panorama image displayed on the panorama region 21 is enlarged by a predetermined magnification ratio.

When the user clicks a wide-angle button 23d by using the mouse, the panorama image displayed on the panorama region 21 is reduced by a predetermined reduction ratio.

When the user clicks an overall finish button 25 by using the mouse, the execution of the monitoring program is finished.

Figure 3:
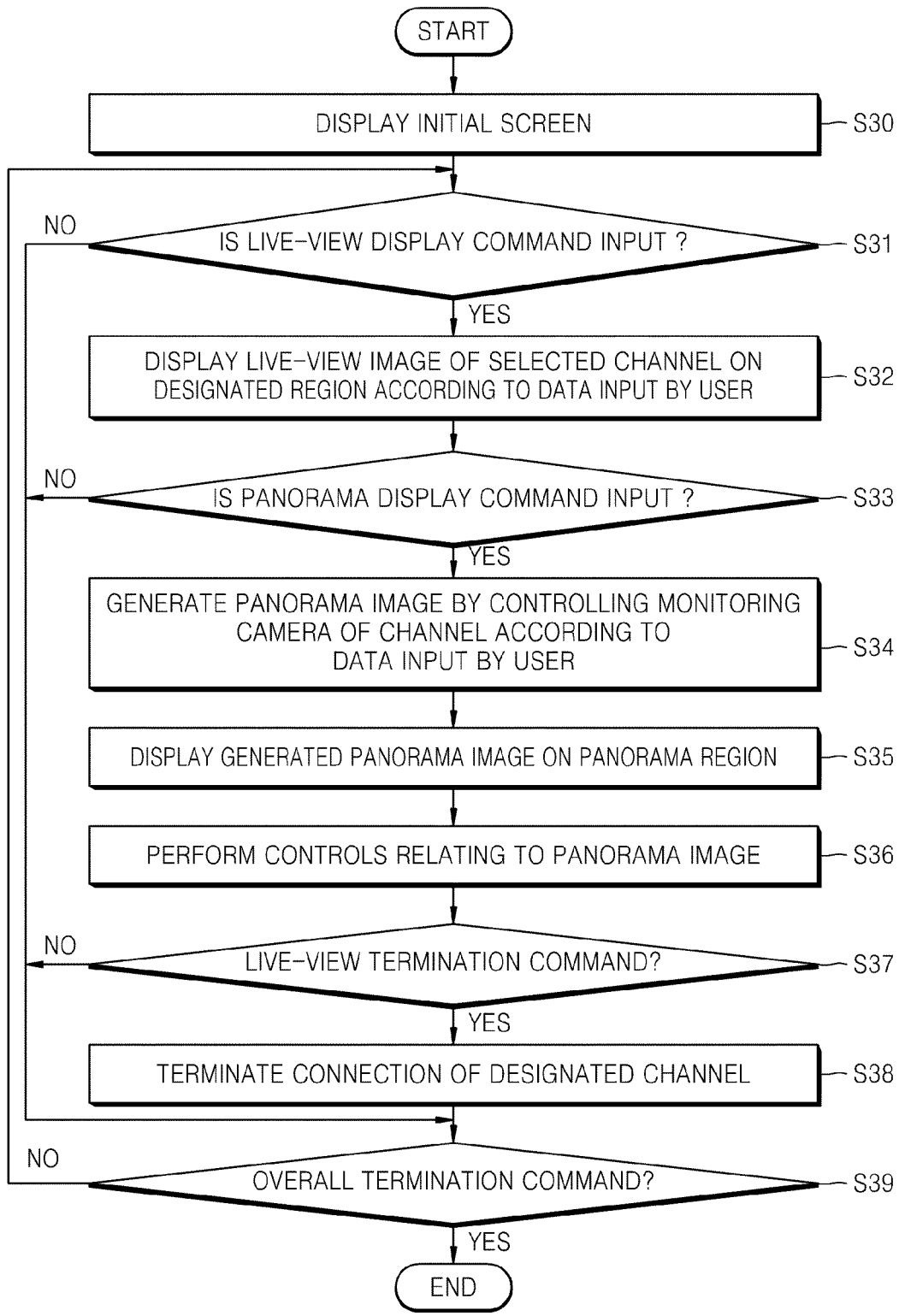
FIG. 3 is a flowchart illustrating a controlling algorithm performed by a computer among the computers shown in FIG. 1, according to an exemplary embodiment.

FIG. 3 is a flowchart illustrating algorithm for controlling the monitoring cameras 1a, 1b and 1c performed by the control unit 330, according to an exemplary embodiment. The controlling algorithm shown in FIG. 3 will be described with reference to FIGS. 2 and 3.

First, the control unit 330 controls the display unit 370 to display an initial screen (S30).

Next, the control unit 330 determines whether a live-view display command is input by a user (S31). If it is determined that a live-view display command is input by the user, the control unit 330 controls the display unit 370 to display a live-view image of a selected channel on a selected region (e.g., the region 221, 22b, 22c or 22d) in a screen of the display unit 370 according to data input by the user (S32).

Here, the live-view display command may include selection of a channel and a region where a live-view image of the selected channel is to be displayed on the screen of the display unit 370. If, however, the control unit 330 determines that the live-view display command is not input by the user, a next operation to determine whether there is an overall termination command input by the user is performed by the control unit 330 (S39).

After the live-view image of the selected channel is displayed on the selected region in the screen of the display unit 370, the control unit 330 determines whether a panorama display command is input by the user (S33). If the control unit 330 determines that the panorama display command is input by the user, the control unit 330 controls the monitoring camera of the selected channel according to data input by the user to generate a panorama image (S34). That is, by performing panning and/or tilting by a control of the control unit 330, the panorama image is generated. If, however, the control unit 330 determines that the live-view display command is not input by the user, a next operation to determine whether there is an overall termination command input by the user is performed by the control unit 330 (S39).

After the panorama image is generated, the control unit 330 controls the display unit 370 to display the generated panorama image on the panorama region 21 (S35).

Then, the control unit 330 performs controls relating to the panorama image (S36). That is, the panorama image and the monitoring camera 1a, 1b or 1c of the panorama image channel are controlled according to commands input by the user through the control unit 330. The control relating to the panorama image (S36) will be described in detail with reference to FIGS. 5 and 6.

When the user inputs a live-view termination command (S37), the control unit 330 terminates the connection of the channel selected by the user (S38).

The above operations S31 through S38 are repeatedly performed until the user clicks the overall finish button 25 in order to generate the finish command through the control unit 330 (S39).

Figure 4:
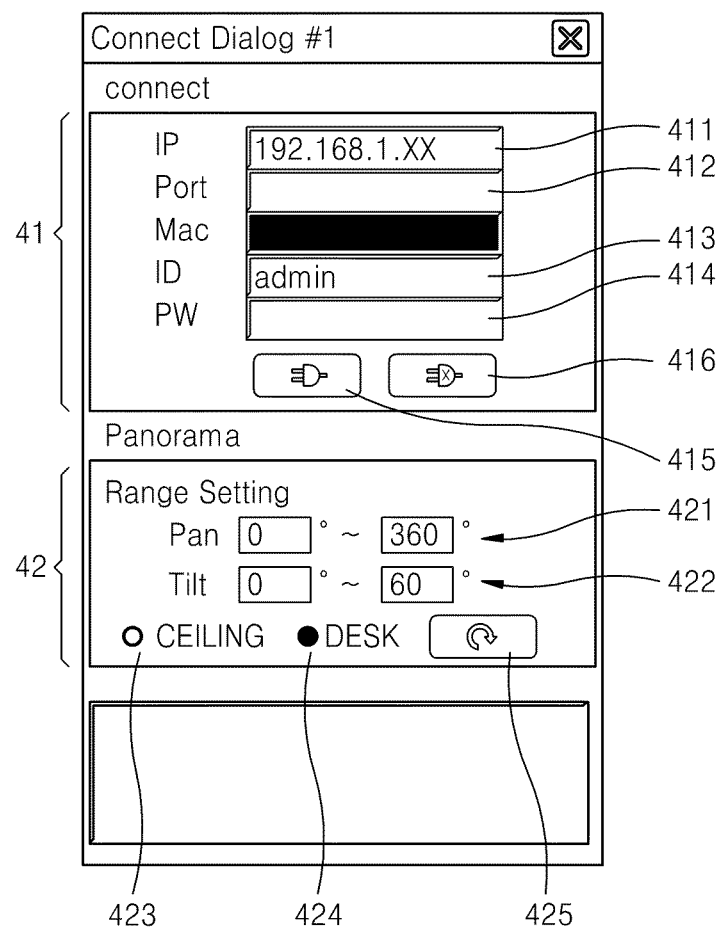
FIG. 4 is a diagram showing a connection input window displayed to input a live-view display command illustrated in S31 of FIG. 3 or a panorama display command illustrated in S33 of FIG. 3, according to an exemplary embodiment.

FIG. 4 is a diagram showing a connection input window 4 that is displayed for commanding the live-view image display in operation S31 or the panorama image display in operation S33 of FIG. 3, according to an exemplary embodiment.

Referring to FIGS. 2 through 4, when the user double-clicks the right side button of the mouse on the desired live-view region 22a, 22b, 22c or 22d, the control unit 330 controls the display unit 370 to display the connection input window 4 as a pop-up window.

Here, a live-view image of the selected channel is displayed on the selected live-view region 22a, 22b, 22c or 22d according to data input through the connection input window 4 by the user through the control unit 330.

In addition, the monitoring camera 1a, 1b or 1c of the live-view channel displayed on the selected region is controlled by the control unit 330 according to data input through the connection input window 4, and thus, a panorama image is generated. The generated panorama image is displayed on the panorama region 21.

In more detail, the connection input window 4 includes a live-view connection designation section 41 and a panorama display setting section 42.

In the live-view connection designation section 41, an input field 411 of an internet-protocol (IP) address is formed. A reference numeral 412 denotes a field for inputting the number of a port used by the monitoring camera 1a, 1b or 1c. Reference numerals 413 and 414 are fields for inputting a log-in identification (ID) and a password of the monitoring camera 1a, 1b or 1c. A reference numeral 415 denotes a live-view execution button, and a reference numeral 416 denotes a live-view termination button.

Therefore, when the IP address, the port number, the log-in ID and the password are input in the live-view connection designation section 41, and the live-view execution button 415 is clicked, the live-view image of the designated channel is displayed on the selected live-view region 22a, 22b, 22c or 22d (refer to operations shown in FIG. 3 and S31 and S32).

When the user clicks the live-view termination button 416, the connection of the channel selected by the user is terminated (refer to S38 of FIG. 3).

In the panorama display setting section 42, a reference numeral 421 denotes panning range setting fields, a reference numeral 422 denotes tilting range setting fields, a reference numeral 423 denotes a ceiling indication button, a reference numeral 424 denotes a desk indication button, and a reference numeral 425 denotes a panorama execution button.

The user sets a panning range of the monitoring camera 1a, 1b or 1c for generating a panorama image in the panning range setting unit 421. In addition, the user sets a tilting range of the monitoring camera 1a, 1b or 1c for generating a panorama image in the tilting range setting unit 422.

If the monitoring camera 1a, 1b or 1c of the selected channel is installed on a ceiling, the user selects the ceiling indication unit 423. If the monitoring camera 1a, 1b or 1c of the selected channel is installed on a desk, the user selects the desk indication unit 423.

After the user sets the panning range, the tilting range and the installation location, when the user clicks the panorama execution button 425 (refer to S33 of FIG. 3), the control unit 330 controls the monitoring camera of the selected channel according to data input by the user to generate a panorama image (refer to FIG. 34 of FIG. 3). In addition, the control unit 330 controls the display unit 370 to display the generated panorama image on the panorama region 21 (S35 of FIG. 3).

Figure 5:
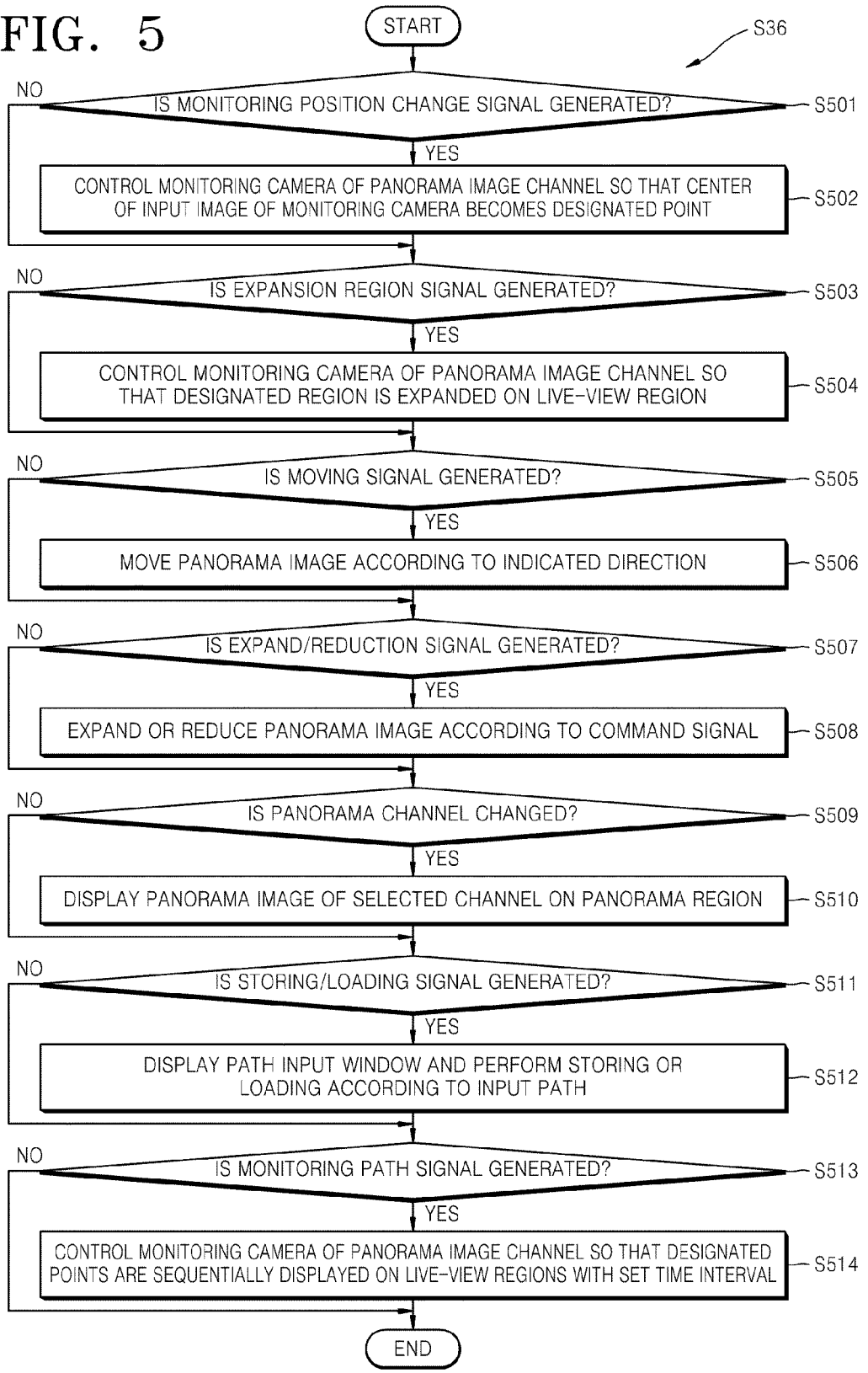
FIG. 5 is a flowchart illustrating a detailed algorithm of a controlling operation relating to the panorama shown in FIG. 3, according to an exemplary embodiment.
Figure 6:
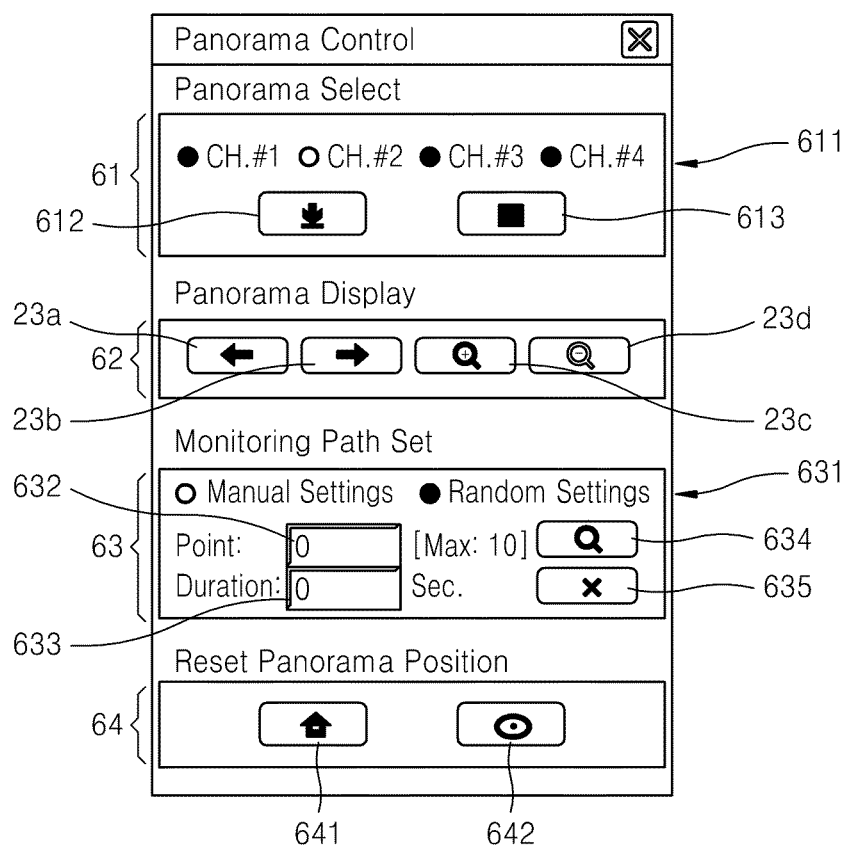
FIG. 6 is a diagram showing a panorama controlling window displayed to perform controls relating to the panorama illustrated in FIG. 5, according to an exemplary embodiment.

FIG. 5 is a flowchart illustrating an algorithm for controlling the panorama image shown in FIG. 3 by the control unit 330, according to an exemplary embodiment. FIG. 6 is a diagram showing a panorama controlling window 6 displayed for performing controls relating to the panorama image, according to an exemplary embodiment.

When the user generates a double-click signal of the right side button of the mouse on the panorama region (21 of FIG. 2), the panorama controlling window 6 is displayed. Accordingly, by the control unit 330 (refer to FIGS. 1 and 7) controls the monitoring camera 1a, 1b or 1c (refer to FIG. 1) of the panorama image channel according to data input by the user through the panorama controlling window 6.

Referring to FIG. 6, the panorama controlling window 6 includes a panorama channel managing section 61, a panorama image adjusting section 62, a monitoring path setting section 63 and a panorama reset section 64.

The panorama channel managing section 61 includes channel selection buttons 611, a file storage button 612 and a file loading button 613.

The user may select a channel corresponding to one of the live-view regions 22a through 22d using the channel selection buttons 611. After selecting a channel, the panorama image of the selected channel is loaded and displayed on the panorama region 21 (refer to FIG. 2).

When the user clicks the file storage button 612, a path input window is displayed as a pop-up window (not shown), and the panorama image currently displayed on the panorama region 21 (refer to FIG. 2) is stored in the storage unit 390 according to a path input by the user.

When the user clicks the file loading button 613, the path input window is displayed as a pop-up window, and a panorama image of a file selected according to a path input by the user is loaded and displayed on the panorama region 21 (refer to FIG. 2).

The panorama image adjusting section 62 includes a left direction button 23a, a right direction button 23b, a zoom button 23c and a wide-angle button 23d. The buttons 23a through 23d are the same as the buttons displayed on the screen of FIG. 2, and thus, detailed descriptions of the buttons 23a through 23d will not be provided here.

The monitoring path setting section 63 includes setting mode buttons 631, an input field of the number of points 632, a monitoring period input field 633, a monitoring path execution button 634 and a monitoring path termination button 635.

When the user selects "random settings" using the setting mode buttons 631, predetermined monitoring path and period are used without regard to the selection of the user.

When the user selects "manual settings" using the setting mode buttons 631, the user should input data in the input field of the number of points 632 and the monitoring period input field 633. Here, if the user presses the monitoring path execution button 634 after inputting a number of monitoring points and a monitoring period, the panorama controlling window 6 is closed, and the user is allowed to designate desired monitoring points in the panorama image by clicking the mouse. After the monitoring points of an input number are designated, the designated monitoring points are sequentially displayed on the live-view region 22a, 22b, 22c or 22d with a set time interval.

The panorama reset section 64 includes an origin reset button 641 and a before reset button 642. When the user clicks the origin reset button 641, a center coordinate of the panorama image is moved to angles of panning 0° and tilting 0°. When the user clicks the before reset button 642, the center coordinate of the panorama image is moved to a center coordinate of the previous panorama image.

The algorithm of the panorama controlling shown in FIG. 5 are described as follows with reference to FIGS. 2, 5 6 and 7.

First, the control unit 330 determines whether a monitoring-position change signal is generated by the user (S501). If it is determined that the monitoring position change signal is generated by the user, the control unit 330 (refer to FIGS. 1 and 7) controls the monitoring camera 1a, 1b or 1c of the panorama image channel so that a center of an input image of the monitoring camera 1a, 1b or 1c is a designated point (S502).

For example, when the user designates a point on the panorama image, a center of the input image of the monitoring camera 1a, 1b or 1c is changed to the designated point. If, however, it is determined that the monitoring position change signal is not generated by the user, a next operation (e.g., S503) is performed.

Next, the control unit 330 determines whether an expansion region signal is generated by the user (S503). If it is determined that the expansion region signal is generated by the user, the control unit 330 controls the monitoring camera 1a, 1b or 1c of the panorama image channel so that an image of a designated area can be enlarged on the live-view region 22a, 22b, 22c or 22d (S504).

For example, when the user designates an area in the panorama image by dragging using the mouse, an image of the designated area is enlarged on the entire portion of the live-view region 22a, 22b, 22c or 22d. If, however, it is determined that the expansion region signal is not generated by the user, a next operation (e.g., S505) is performed.

Next, the control unit 330 determines whether a moving signal is generated by the user (S505). If it is determined that the moving signal is generated by the user, the control unit 330 moves the panorama image according to the commanded direction (S506).

For example, when the user clicks the left direction button (23a of FIG. 2 or FIG. 6) by using the mouse, the panorama image on the panorama region 21 is moved to a left side by 10°. When the user clicks the right direction button (23b of FIG. 2 or FIG. 6) by using the mouse, the panorama image on the panorama region 21 is moved to a right side by 10°. If, however, it is determined that the moving signal is not generated by the user, a next operation (e.g., S507) is performed.

Next, the control unit 330 determines whether an expansion/reduction signal is generated by the user (S507). If it is determined that the expansion/reduction signal is generated by the user, the control unit 330 enlarges or reduces the panorama image according to the commanded signal (S508).

For example, when the user clicks the zoom button (23c of FIG. 2 or FIG. 6) by using the mouse, the panorama image displayed on the panorama region 21 is enlarged by a predetermined magnification ratio and displayed. When the user clicks the wide-angle button (23d of FIG. 2 or FIG. 6) by using the mouse, the panorama image displayed on the panorama region 21 is reduced by a predetermined reduction ratio and displayed. If, however, it is determined that the expansion/reduction signal is not generated by the user, a next operation (e.g., S509) is performed.

Next, the control unit 330 determines whether a panorama channel change signal is generated by the user (S509). If it is determined that the panorama channel change signal is generated by the user, the control unit 330 controls the display unit to display the panorama image of a selected channel on the panorama region 21 (S510).

For example, when the user selects a channel corresponding to one of the live-view regions 22, 22b, 22c and 22d on the channel selection unit 611 (refer to FIG. 6) in the panorama controlling window (6 of FIG. 6) and closes the panorama controlling window, the panorama image of the channel selected in the channel selection unit 611 is loaded and displayed on the panorama region 21. If, however, it is determined that the panorama channel change signal is not generated by the user, a next operation (e.g., S511) is performed.

Next, the control unit 330 determines whether a storing/loading signal is generated by the user (S511). If it is determined that the storing/loading signal is generated by the user, the control unit 330 controls the display unit 370 to display a path input window (not shown), and performs the storing or loading operation according to the input path (S512).

For example, when the user clicks the file storage unit 612 in the panorama controlling window (6 of FIG. 6), the path input window is displayed as a pop-up window, and the panorama image currently displayed on the panorama region (21 of FIG. 2) is stored in the storage unit 390 according to the path input by the user.

In addition, when the user clicks the file loading unit 612, the path input window is displayed as a pop-up window, and the panorama image of the file designated according to the input path of the user is loaded and displayed on the panorama region (21 of FIG. 2). If, however, it is determined that the storing/loading signal is not generated by the user, a next operation (e.g., S513) is performed.

Next, the control unit 330 determines whether a monitoring path signal is generated by the user (S513). If it is determined that the monitoring path signal is generated by the user, the control unit 330 controls the monitoring camera 1a, 1b or 1c of the panorama image channel so that designated points can be sequentially displayed on the live-view region 22a, 22b, 22c or 22d with a set time interval (S514).

For example, when the user inputs data in the input field of the number of points 632 and the monitoring period input field 633 in the panorama controlling window (6 of FIG. 6) and designates desired monitoring points in the panorama image by clicking the mouse, the designated points are sequentially displayed on the live-view region 22a, 22b, 22c or 22d with a set time interval.

As described above, according to the exemplary embodiments, the monitoring camera of the panorama image channel and the panorama image are controlled according to commands input by the user in a state where the panorama image is displayed.

Therefore, the user easily searches for and designates areas to be monitored in the panorama image without performing panning and/or tilting operations with respect to each of the monitoring cameras.

For example, when the user wants to enlarge an image of an area within an entire monitoring region of one monitoring camera, the user easily searches for and designates the area which image is to be enlarged in the panorama image without performing panning and/or tilting of the monitoring camera.

In addition, when the user wants to sequentially monitor a plurality of points within an entire monitoring region of one monitoring camera with a set time interval, the user also easily searches for and designates the plurality of points to be monitored in the panorama image without performing panning and/or tilting of the monitoring camera.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of controlling a plurality of cameras, the method comprising:
    receiving a plurality of live-view images of a plurality of different areas respectively taken by the plurality of cameras;
    displaying the plurality of live-view images on a plurality of live-view regions, respectively, in a screen of a display comprising the live-view regions and a panorama region;
    selecting a live-view image from among the live-view images which are displayed on the plurality of live-view regions, respectively;
    controlling a camera, among the plurality of cameras, which takes the selected live-view image to generate a panorama image based on the selected live-view image; and
    displaying the generated panorama image on the panorama region,
    wherein the panorama image is generated by performing at least one of panning, tilting and zooming operations on the camera taking the selected live-view image, and
    wherein the method further comprises:
    controlling a plurality of areas in the panorama image to be designated; and
    controlling live-view images of the plurality of designated areas to be displayed in at least one designated region in the screen.

2. The method of claim 1, wherein in the controlling live-view images of the plurality of designated areas to be displayed in at least one designated region in the screen, the live-view images of the plurality of designated areas are displayed in the at least one designated region at a predetermined order and at a preset time interval.

3. The method of claim 1, wherein the plurality of live-view images of the plurality of designated areas are displayed in at least one designated region in the screen in an enlarged or reduced form.

4. The method of claim 3, wherein a center of each the plurality of live-view images to be displayed in the at least one designated region is an area designated in the panorama image.

5. An apparatus controlling a plurality of cameras, the apparatus comprising:
    an input unit which receives a plurality of live-view images of a plurality of different areas respectively taken by the plurality of cameras; and
    a controller which:
    controls a display to display the plurality of live-view images on a plurality of live-view regions, respectively, in a screen of the display comprising the live-view regions and a panorama region;
    selects a live-view image from among the live-view images which are displayed on the plurality of live-view regions, respectively;
    controls a camera, among the plurality of cameras, which takes the selected live-view image to generate a panorama image based on the selected live-view image; and
    displays the generated panorama image on the panorama region;
    wherein the controller controls the camera taking the selected live-view image to generate the panorama image by at least one of panning, tilting and zooming operations, and
    wherein the controller controls a plurality of areas in the panorama image to be designated, and controls the display to display live-view images of the plurality of designated areas in a plurality of designated regions in the screen.

6. The apparatus of claim 5, wherein the controller controls the display to display the live-view images of the plurality of designated areas in the plurality of designated regions in the screen at a predetermined order and at a preset time interval.

7. The apparatus of claim 5, wherein a center of each the plurality of live-view images to be displayed in each of the plurality of designated regions is an area in the panorama image designated by the controller.

8. The apparatus of claim 5, wherein each of the plurality of live-view images of the plurality of designated areas is a portion of the panorama image.

9. The apparatus of claim 5, wherein the plurality of live-view images to be displayed in the plurality of designated regions are taken by the camera which takes the selected live-view image.

10. The method of claim 1, wherein each of the plurality of live-view images of the plurality of designated areas is a portion of the panorama image.

11. The method of claim 4, wherein the live-view images to be displayed in the plurality of designated regions are taken by the camera which takes the selected live-view image.

* * * * *